US005551668A

United States Patent [19]
Hung

[11] Patent Number: 5,551,668
[45] Date of Patent: Sep. 3, 1996

[54] HYDRAULIC JACK WITH RESTORABLE LEVER AND RETAINING DEVICE

[76] Inventor: Michael Hung, 9-16, Nan Kan Hsia, Nan Kan, Lu Chu Hsiang, Tao Yuan County, Taiwan

[21] Appl. No.: 336,240

[22] Filed: Nov. 7, 1994

[51] Int. Cl.[6] .................... B60P 1/48
[52] U.S. Cl. .................... 254/8 B; 254/93 H
[58] Field of Search .................... 254/93 H, 93 R, 254/8 B, 2 B, DIG. 3; 74/519, 512, 523, 524, 566, 101; 60/477, 479; 16/114 R

[56] References Cited

U.S. PATENT DOCUMENTS

| | | | |
|---|---|---|---|
| 4,151,720 | 5/1979 | Vanderstappen | 60/479 |
| 4,656,879 | 4/1987 | Jen | 254/93 M |
| 4,825,755 | 5/1989 | Takano | 60/477 |
| 4,850,568 | 7/1989 | Hung | 254/8 B |
| 4,895,042 | 1/1990 | Wang | 254/8 B |
| 5,433,127 | 7/1995 | Messier | 254/93 H |

*Primary Examiner*—Robert C. Watson
*Attorney, Agent, or Firm*—Wenderoth, Lind & Ponack

[57] ABSTRACT

A hydraulic jack with a restorable lever and a retaining device includes a positioning blind hole provided on one side of a base. The blind hole holds a compression spring which acts between the base and a lever holder. A supporting post on one side of the base is provided with a pin hole for accepting a retaining pin to hold the lever holder in place. When the retaining pin is removed for operation, the stored energy of the compression spring is released so that the lever is lifted up automatically each time when it is pressed downwardly. A V-shaped spring clip connects the lever to the lever holder. A forward end of the lever is provided with a gripping hole and has two side notches, thus shaping the gripping hole to enable the lever to be used for opening and closing of a releasing valve. A foot pedal or a handle can be attached to an end of the lever for ease of operating the hydraulic jack.

15 Claims, 5 Drawing Sheets

HYDRAULIC JACK WITH RESTORABLE LEVER AND RETAINING DEVICE

BACKGROUND OF THE INVENTION (a) Field of the Invention

The present invention relates to a hydraulic jack with a restorable lever and a retaining device, particularly a hydraulic jack in which the lever automatically can be restored to an original position thereof and also that can be properly retained in a depressed position after it is pressed down. In addition, the lever can be integrated quickly with a lever holder, and a foot pedal or a handle can be provided on the lever to ease operation of the hydraulic jack.

(b) Description of the Prior Art

A conventional hydraulic jack is generally provided with a handle (a manual rod) which can be moved up and down to drive a pump for a lifting operation. A user gets tired easily when he repeats such up and down movements of the handle. Therefore, it is known to provide an automatically restorable handle for such a hydraulic jack. However, the conventional hydraulic jack with such a restorable lever employs a return spring within a pump assembly of the hydraulic jack, so that such spring releases its energy each time the pump cylinder is pressed down.

SUMMARY OF THE INVENTION

The main object according to the present invention is to provide a structure for a hydraulic jack with a restorable lever and a retaining device, wherein a positioning blind hole is provided in a base of the hydraulic jack at a position outwardly of the pump assembly. A longer compression spring is provided between the positioning blind hole and the lever holder. By extending the length of the spring, the elasticity and the stored energy of the spring can be enhanced. The moment arm and the lever returning power are increased, the life of the spring is also extended, and the disadvantage of an excessive moment is eliminated. A pin hole is provided in a top of a supporting post of the base to receive a retaining pin so that the lever holder can be retained in a pushed down position. This allows the lever holder to be retained in a horizontal position to prevent occupying too much space and to provide a more practical structure.

Another object according to the present invention is to provide a structure for a hydraulic jack with a restorable lever and a retaining device, wherein a forward end of the lever is provided with a gripping hole having two notches on two sides thereof, thus providing a shape so that a releasing valve of the hydraulic jack can be opened or closed. An external wall of the lever at a forward portion thereof is provided with a narrow elongated hole for accepting a protrusion of a V-shaped spring clip that is inserted into the forward end of the lever. The protrusion is retained in the narrow elongated hole in the lever and also in another narrow elongated hole provided in the external wall of the lever holder when the lever is pushed into the lever holder. This assures a firm fastening of the lever to the lever holder and a quick and easy detaching of the lever from the lever holder.

A further object according to the invention is to provide a structure for a hydraulic jack with a restorable lever and a retaining device, wherein the lever can be provided with either a foot pedal or a handle for ease of operation.

BRIEF DESCRIPTION OF THE DRAWINGS

The drawings disclose an embodiment of the present objects thereof. In the drawings: invention which serves to exemplify the various advantages

DETAILED DESCRIPTION OF PREFERRED EMBODIMENTS

Figure 1:
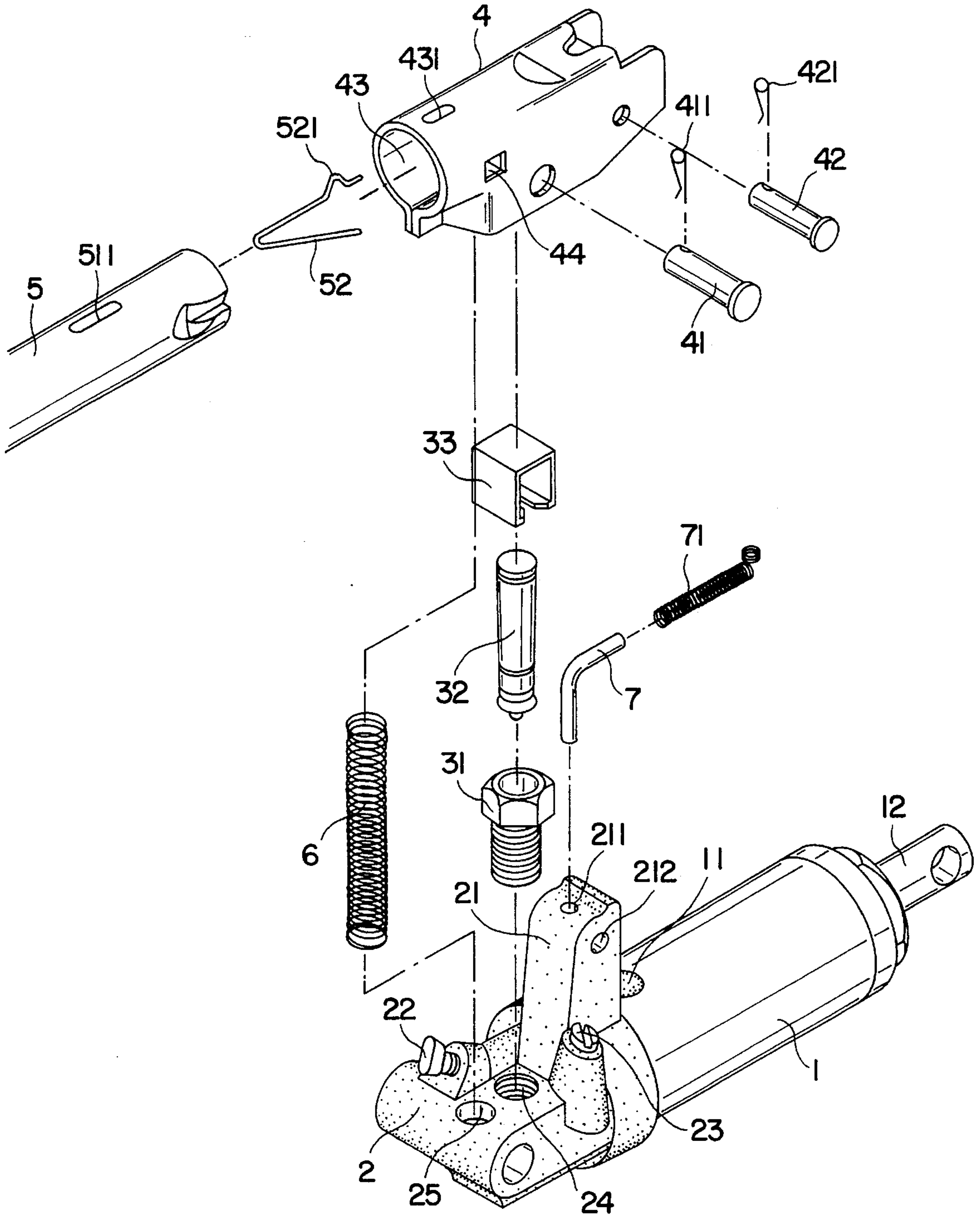
FIG. 1 is a perspective fragmented view of an assembly of a hydraulic jack according to the present invention.

As shown in FIG. 1, a hydraulic jack assembly of the present invention includes a hydraulic cylinder main body 1, a base 2, a pump assembly, a lever holder 4, a lever 5, a compression spring 6 and a retaining pin 7.

The hydraulic cylinder main body 1 is of conventional design and has an exterior wall provided with an oil plug 11 and one end provided with a lifting piston 12.

The base 2 is provided at one end of the hydraulic cylinder main body 1 opposite piston 12. A first end of base 2 adjacent the hydraulic cylinder main body is provided with a supporting post 21, a releasing valve 22 (i.e., oil return valve) and a safety valve 23. A center portion of the base 2 has therein an opening in the form of a screw hole 24 for the pump assembly. Adjacent an outside edge or second end thereof the base 2 is provided with a spring support in the form of positioning blind hole 25 for the insertion of one end of the compression spring 6. The top of the supporting post 21 is provided with a vertical pin hole 211 which is used to accommodate a retaining pin 7.

The pump assembly includes a hex head screw 31 having a hollow body, a piston 32 and a pulling base or member 33. The overall structure is similar to that of a conventional design and therefore is not described herein in further detail.

Figure 2:
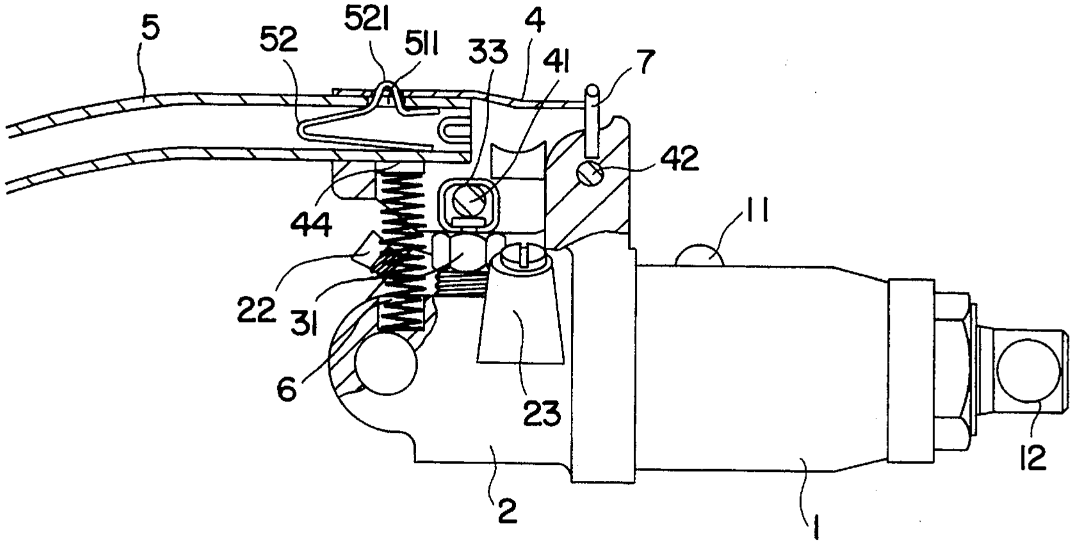
FIG. 2 is a sectional view of a portion thereof, with a lever holder being shown blocked in place by a retaining pin.

The lever holder 4 is secured by two securing pins 41 and 42 that extend respectively through the pulling base 33 of the pump assembly and a hole 212 of the supporting post 21 of base 2. Thereby, the lever holder 4 is connected with the pulling base 33 and is pivotally connected with the supporting post 21 of the base 2. A top wall at an opening 43 at one end of the lever holder 4 is provided with a small, elongated hole 431. Two side walls of lever holder 4 are punched through to define bent tabs or plates 44 extending inwardly. This configuration allows the lever 5 to be inserted through opening 43 into the lever holder 4, and the bent plates 44 form an abutment acting on the upper end of the compression spring 6 to enable compression thereof (as shown in FIG. 2).

Figure 5:
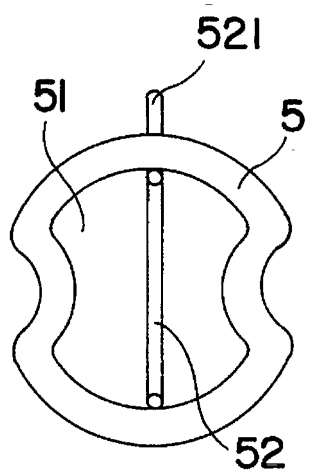
FIG. 5 is a top view showing a gripping hole formed at a forward opening of the lever according to the present invention.

The lever 5 is a hollow tube and is different from a conventional structure. A forward end of the lever 5 is provided with a gripping hole 51 having two notches in opposite sides thereof (as shown in FIG. 5). The external wall of lever 5, at a forward portion thereof, is provided with a narrow elongated hole 511. A V-shaped spring clip 52 is inserted into lever 5 such that a protrusion thereof is retained in the narrow elongated hole 511. The protrusion 521 projects outwardly of lever 5 from the narrow elongated hole 511.

The compression spring 5 is inserted into the positioning blind hole 25 of the base 2 and is secured between the base 2 and the bent plates 44 on opposite sides of the lever holder 4.

Figure 3:
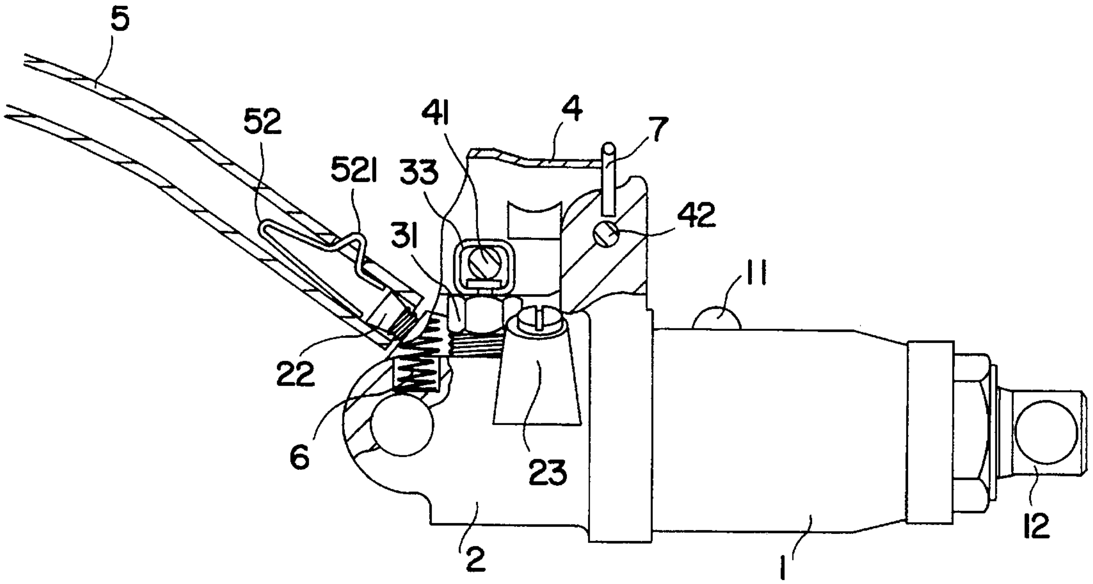
FIG. 3.is a sectional view similar to FIG. 2, but with a lever shown inserted for adjustment of opening and closing a releasing valve.
Figure 4:
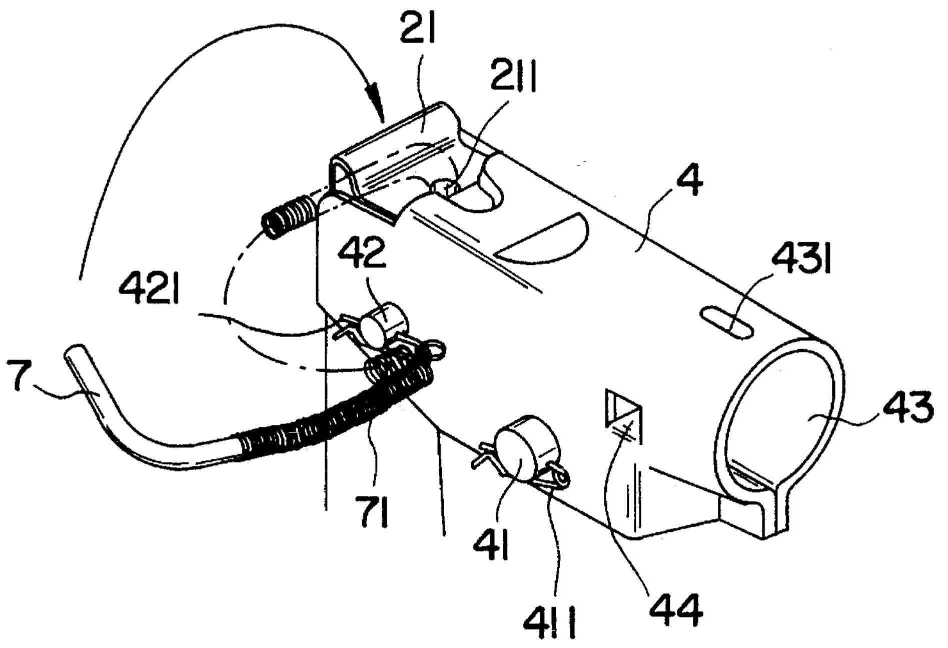
FIG. 4 is a perspective view showing an assembly of the lever holder and the retaining pin according to the present invention.

The retaining pin 7 may have the form of a straight rod or an L-shaped rod, (as shown in the drawings). One end of the retaining pin 7 may cooperate with one end of a spring 71, an opposite end of which can be wound around either one of the cotter pins 411 and 421 of the securing pins 41 or 42, (as shown in FIG. 4), thus preventing the retaining pin 7 from becoming lost. In use, an end of the retaining pin 7 opposite spring 71 can be inserted into the pin hole 211 of the supporting post 21 of the base 2. The lever holder 4 thereby is restrained, as shown in FIGS. 2 and 3, such that it cannot be lifted upwardly and is maintained in a horizontal position.

The above described compression spring 6 is placed in the positioning blind hole 25 and thereby between the base 2 and the inward bent plates 44 on both sides of the lever holder 4. Since the blind hole 25 is located outwardly of the pump assembly, the pump assembly does not interfere with spring 6, and spring 6 will not cause any inconvenience in assembling the pump assembly. In addition, the location of the pump assembly is not used as a fulcrum for releasing the return energy of the spring 6, contrary to the conventional design. Further, since the compression spring 6 is located outwardly of the assembly, the total length of the spring can be increased, thus avoiding use of a short spring placed directly inside the pump assembly. The increase in the overall length of the compression spring provides improved resiliency. Based on the lever principle, when the lever 5 is pressed downwardly, the compression spring 6 forms a fulcrum for release of the energy thereof. The compression spring 6 is spaced from the fixed point of the lever, i.e. the securing pin 42. There is no need to increase the load of the compression spring 6. The return force of the spring is more pronounced.

Figure 6:
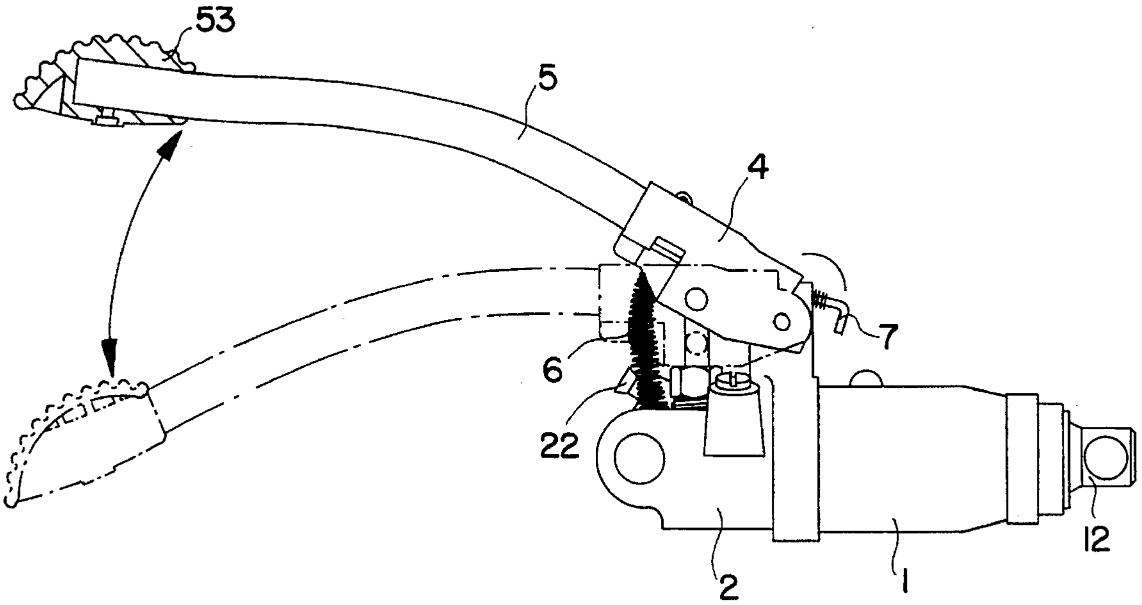
FIG. 6 is an elevation view showing a foot pedal attached to one end the lever according to the present invention.
Figure 7:
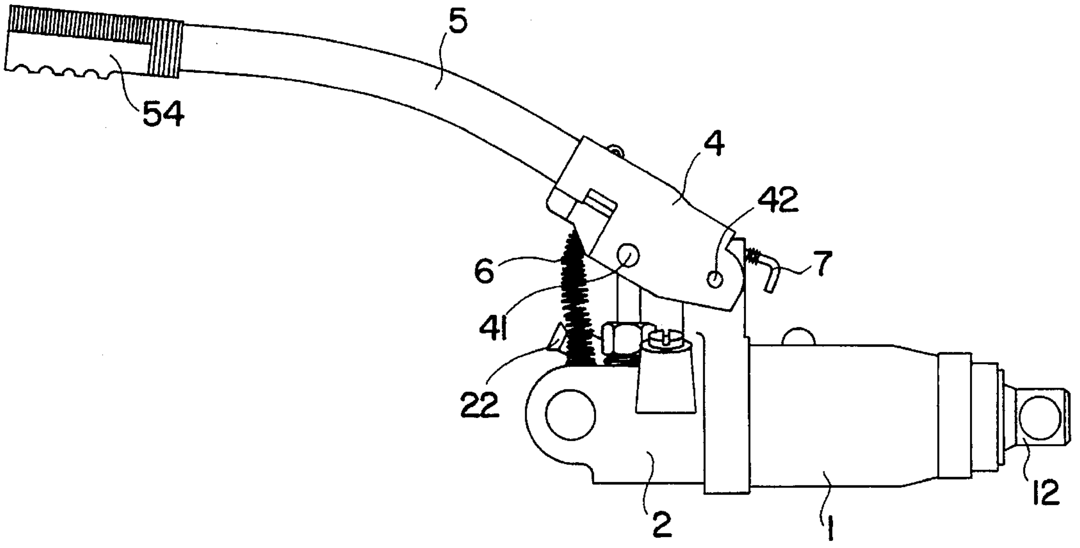
FIG. 7 is an elevation view showing a handle attached to one end of the lever according to the present invention.
Figure 8:
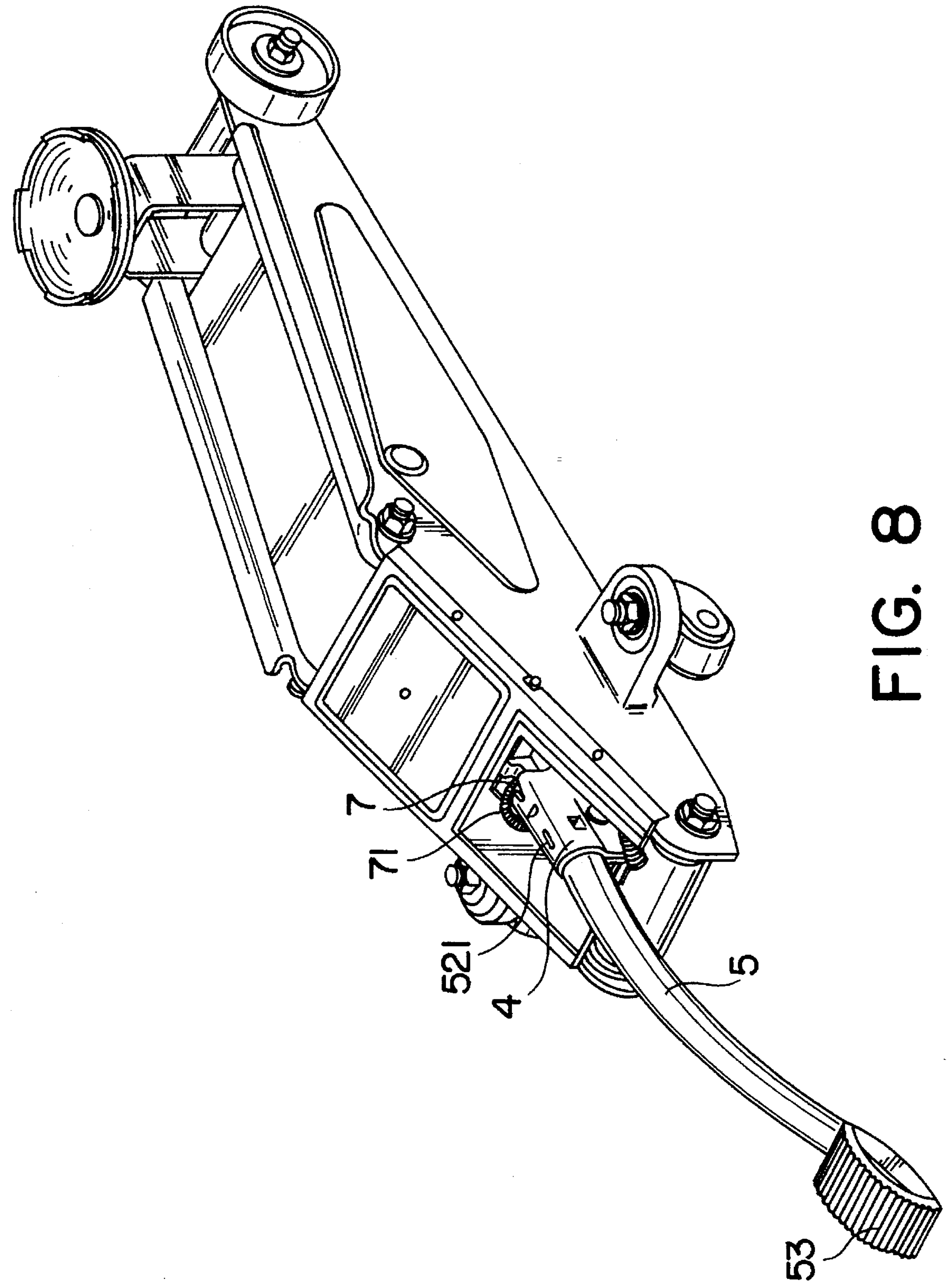
FIG. 8 is a perspective view of the hydraulic jack according to the present invention.

The gripping hole 51 provided at the forward end of the lever 5 is employed to adjust the opening and closing of the releasing valve 22. When the hydraulic jack is to be operated, the gripping hole 51 of the lever 5 is inserted over the releasing valve 22. By rotating the lever 5, the releasing valve 22 can be closed, as shown in FIG. 3. The lifting operation of the hydraulic jack then can be conducted. The outer end of the lever 5 can be provided with a foot pedal 53 as shown in FIG. 6 or a handle 54 as shown in FIG. 7 to enable manual operation by foot or by hand. This provides practicality and convenience for the user.

The present invention provides the following features that are different from the conventional hydraulic jack.

(1) The compression spring 6 is not directly mounted inside the pump assembly. Therefore, assembly of the spring and pump will not interfere with each other. In addition, assembly will be quick and easy. The compression spring 6 is located and placed on the outside of the base 2 and acts against the inwardly bent plates 44 of the lever holder 4. Thereby, the effective length of the compression spring 6 can be increased and resiliency thereof is improved compared to a conventional shorter spring.

(2) The fulcrum of the compression spring 6 is such that movement of the spring is not restricted by the pump assembly. Since the compression spring 6 is spaced from the fixed point of the lever, the moment arm releasing the return force of the spring is extended, making it easier for the lever 5 to return automatically to its rest or start position.

(3) Pin hole 211 provides for insertion of the retaining pin 7 so as to block the lever holder 4. This restricts upward movement of the lever holder 4 and the lever 5, thereby resulting in easy and convenient storage, packing or transportation of the hydraulic jack. This saves space and makes the present invention more practical.

(4) The forward end of the lever 5 is provided with a gripping hole 51 shaped to enable easy access to and closing and opening of the releasing valve 22. The V-shaped spring clip 52 integrated with the lever 5 enables quick and easy latching of the lever 5 into the lever holder 4, as shown in FIG. 2. For removal of lever 5, all that is required is to press inwardly the exposed protrusion 521 of the spring clip 52 and to pull out the lever 5 from lever holder 4. Therefore, the insertion and removal of lever 5 is very convenient. The latching of the spring clip is relatively secure. Compared to a conventional screw-in type lever with an L-shaped slot, the present invention provides a new and advanced method to latch and unlatch the lever.

(5) The foot pedal 53 or handle 54 can be added to the lever 5 to enhance its operation, providing a practical and convenient mechanism for the user to operate the jack.

It is understood that the foregoing description and accompanying illustrations are merely exemplary, and various changes and modifications to such preferred embodiment will be apparent to those skilled in the art. The scope of this invention is defined solely by the appended claims and their equivalents.

What is claimed is:

1. A hydraulic jack comprising:

a hydraulic cylinder main body;

a base at an end of said main body, said base having at a first end thereof adjacent said main body a supporting post, a second end spaced from said main body, and a central portion between said first and second ends;

a pump assembly mounted in said central portion of said base;

a lever holder connected to said pump assembly and having a first end pivotally connected to said supporting post and two side walls having extending therebetween an abutment;

a lever connectable to a second end of said lever holder and operable to pivot said lever holder in first and second opposite directions toward and away from said base and thereby to operate said pump assembly;

a compression spring having a first end supported at said second end of said base and a second end abutting said abutment, such that when said lever holder is pivoted in said first direction said abutment acts on and compresses said compression spring, thereby generating stored energy in said compression spring acting on said lever holder to urge said lever holder to pivot in said second direction; and a retaining pin insertable in a pin hole in said supporting post to abut said lever holder and prevent said lever holder from pivoting in said second direction.

2. A hydraulic jack as claimed in claim 1, wherein said base has a safety valve and a release valve.

3. A hydraulic jack as claimed in claim 2, wherein a forward end of said lever has a gripping hole of a configuration to fit over said release valve and to enable opening and closing adjustment thereof.

4. A hydraulic jack as claimed in claim 1, wherein said pump assembly is threadingly engaged in a threaded opening in said central portion of said base.

5. A hydraulic jack as claimed in claim 1, wherein said pump assembly includes a piston and a pulling member engaging said piston, and said lever holder is connected to said pulling member.

6. A hydraulic jack as claimed in claim 1, further comprising first and second connecting pins respectively connecting said lever holder to said supporting post and said pump assembly.

7. A hydraulic jack as claimed in claim 1, wherein said first end of said compression spring is inserted in a hole formed in said second end of said base.

8. A hydraulic jack as claimed in claim 1, wherein said abutment comprises two lugs extending inwardly from said side walls and punched from the material thereof.

9. A hydraulic jack as claimed in claim 1, wherein said second end of said lever holder comprises a wall defining an opening to receive a forward end of said lever, said wall having therethrough a first hole, and said forward end of said lever comprises a wall having therethrough a second hole, and further comprising a V-shaped spring clip fitted within said forward end, said spring clip having a protrusion extending through said second hole and, when said forward end is fitted in said opening of said second end of said lever holder, extending into said first hole.

10. A hydraulic jack as claimed in claim 9, wherein said first and second holes are elongated.

11. A hydraulic jack as claimed in claim 1, wherein said retaining pin is a straight rod.

12. A hydraulic jack as claimed in claim 1, wherein said retaining pin is L-shaped.

13. A hydraulic jack as claimed in claim 1, further comprising a retaining spring connecting said retaining pin to said jack.

14. A hydraulic jack as claimed in claim 1, further comprising a handle on said lever.

15. A hydraulic jack as claimed in claim 1, further comprising a foot pedal on said lever.

* * * * *